(No Model.)
J. R. LINTON.
VEHICLE SPRING.
No. 399,677. Patented Mar. 19, 1889.
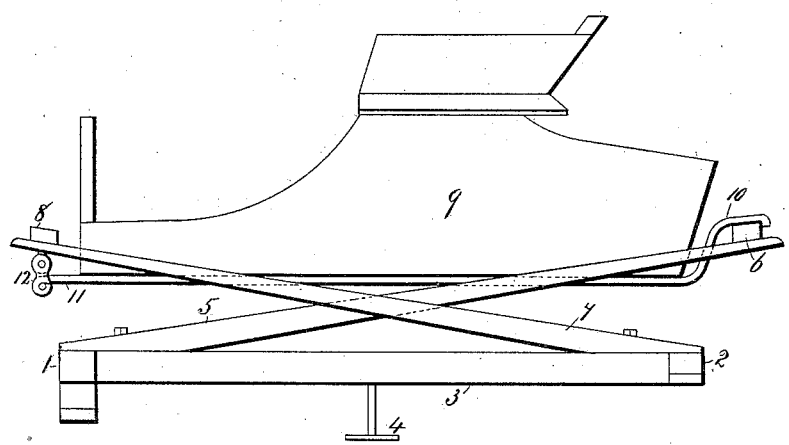
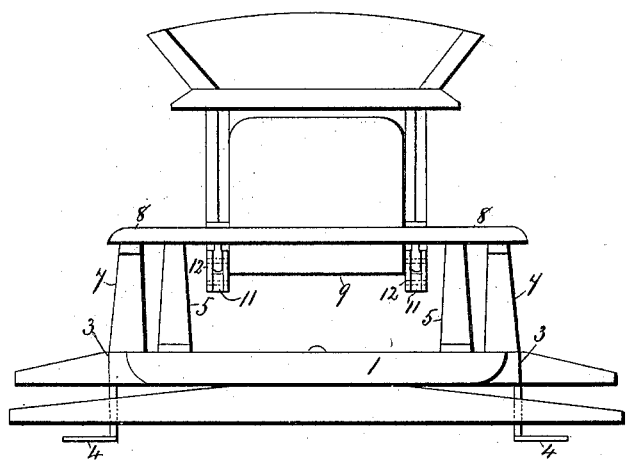 
Witnesses:
John Buckler,
D. S. Ritterband
Inventor:
J. R. Linton.
By A. M. Pierce.
Attorney.

UNITED STATES PATENT OFFICE.

JOHN R. LINTON, OF NEW BEDFORD, MASSACHUSETTS.

VEHICLE-SPRING.

SPECIFICATION forming part of Letters Patent No. 399,677, dated March 19, 1889.

Application filed August 3, 1888. Serial No. 281,885. (No model.)

*To all whom it may concern:*

Be it known that I, JOHN R. LINTON, a citizen of the United States, and a resident of New Bedford, in the county of Bristol and State of Massachusetts, have invented certain new and useful Improvements in Vehicle-Springs, of which the following is a specification.

My invention relates especially to carriage or buggy springs and means of applying them, and has for its object the provision of a spring, light, cheap and simple to construct, and easy to apply, which shall practically overcome what is known as "backslat" and danger of the occupants being thrown from the vehicle while turning corners, and shall lessen the tendency of the axle to become sprung and the parts to rattle or get out of order.

To attain the desired end my invention consists, essentially, in the combination, with the rear axle and head-block, of curved connecting-bars, whereon are secured four wooden springs, two of said springs being secured near the rear axle and the other two near the head-block, all of said springs being secured so that they extend upward at an angle, and the free ends of each pair of springs are united by cross-bars which bear the vehicle-body. The hanging-irons at the rear of said body are secured directly to the cross-bar, and the forward hanging-irons to links depending from the cross-bar, all of which will be hereinafter first fully described, and then pointed out in the claims.

In the drawings, Figure 1 is a side elevation of a vehicle-body supported upon my improved springs, and Fig. 2 is a front elevation of the same. Fig. 3 is a plan view of one of the connecting side bars.

Like numerals of reference, wherever they occur, indicate corresponding parts in all the figures.

1 is the head-block and 2 the rear axle, connected together by the curved side bars, 3. This curved bar braces the parts, permits the springs to cross each other, and allows the fore wheels of the vehicle to approach the vehicle-body while turning, lessening the necessary radius of the circle.

4 4 are steps secured to the side bars, 3, and as they hang very low my vehicle is easy to enter or descend from.

5 5 are wooden springs, beveled at their lower ends, secured to the forward end of the frame, and extending to a connecting cross-bar, 6, at the rear of the vehicle. 7 7 are similar wooden springs, secured at the rear of the frame and extending to a connecting cross-bar, 8, at the front of the vehicle.

9 is the vehicle-body, provided at rear with hanging-irons 10, secured to cross-bar 6, and at the front with hanging-irons 11, connected to links 12, depending from cross-bar 8.

When constructed and arranged in accordance with the foregoing description, my improved vehicle-spring will be found admirably adapted to the uses and purposes for which it is intended. As the springs are made of wood, they are cheap, and easy to construct and apply. They cannot get out of order, and will last much longer than metal springs, and are noiseless. By placing the links at the front of the body-supporting frame allowance is made for the lengthening of the distance between the bars 8 and 10 as the body is depressed.

Having now fully described my invention, what I claim as new therein, and desire to secure by Letters Patent, is—

1. The combination, with the side bars, 3, of the wooden springs supported thereon near the ends of the said bars 3, extending thereabove at an angle, and passing each other near their centers, substantially as shown and described.

2. In a device of the character herein specified, head-block 1, rear axle, 2, curved side bars, 3, wooden springs 5 and 7, connecting cross-bars 6 and 8, hanging-irons 10 and 11, and links 12, connecting hanging-irons 11 with cross-bar 8, the whole combined and arranged substantially as shown and described.

Signed at New Bedford, in the county of Bristol and State of Massachusetts, this 24th day of July, A. D. 1888.

JOHN R. LINTON.

Witnesses:
THOMAS B. HATHAWAY,
JAMES CRAFT.